(12) United States Patent
Yang et al.

(10) Patent No.: US 11,474,201 B2
(45) Date of Patent: Oct. 18, 2022

(54) METHOD OF CONTROLLING TRANSMITTING FREQUENCIES OF MICROWAVE SOURCE AND MICROWAVE TRANSMISSION SYSTEM THEREOF

(71) Applicant: Sichuan University, Sichuan (CN)

(72) Inventors: Yang Yang, Sichuan (CN); Kama Huang, Sichuan (CN); Xing Chen, Sichuan (CN); Changjun Liu, Sichuan (CN); Huacheng Zhu, Sichuan (CN)

(73) Assignee: Sichuan University, Sichuan (CN)

( * ) Notice: Subject to any disclaimer, the term of this patent is extended or adjusted under 35 U.S.C. 154(b) by 426 days.

(21) Appl. No.: 16/711,448

(22) Filed: Dec. 12, 2019

(65) Prior Publication Data

US 2020/0116821 A1    Apr. 16, 2020

(51) Int. Cl.
*G01S 7/282* (2006.01)
*H05B 6/68* (2006.01)
*H05B 6/66* (2006.01)

(52) U.S. Cl.
CPC .............. *G01S 7/282* (2013.01); *H05B 6/686* (2013.01); *H05B 6/666* (2013.01)

(58) Field of Classification Search
CPC ................................. G01S 7/282; H05B 6/686
USPC ........................................................ 324/124
See application file for complete search history.

(56) References Cited

U.S. PATENT DOCUMENTS

2021/0321497 A1\* 10/2021 Ji ............................ F24C 7/085

FOREIGN PATENT DOCUMENTS

| CN | 102706901 A | \* | 10/2012 | |
| CN | 113992983 A | \* | 1/2022 | |
| DE | 102018202519 A1 | \* | 8/2019 | ............. H05B 6/688 |

\* cited by examiner

*Primary Examiner* — Harry K Liu

(57) ABSTRACT

The present invention discloses a method of controlling transmitting frequencies of microwave source, which includes the following steps of: a) collecting reflection frequencies of a load according to a pre-set sampling rate; b) calculating a change rate of the reflection frequencies collected in the step a; c) setting a reflection frequency threshold and a change rate threshold; d) comparing the reflection frequencies and the change rate with the reflection frequency threshold and the change rate threshold respectively; wherein if the reflection frequencies or the change rate is less than the threshold goes to step e or returns to the step a; e) sending control signals to the microwave source and tuning the transmitting frequencies; and f) returning to step a. The present invention also discloses a microwave transmission system thereof. The present invention can be applied in controlling microwave source consists of single magnetron tube or multiple magnetron tubes.

3 Claims, 2 Drawing Sheets

METHOD OF CONTROLLING TRANSMITTING FREQUENCIES OF MICROWAVE SOURCE AND MICROWAVE TRANSMISSION SYSTEM THEREOF

BACKGROUND OF THE PRESENT INVENTION

Field of Invention

The present invention relates to microwave application field, and more particularly to transmitting frequencies control technology which is focus on the method of controlling the transmitting frequencies of the microwave source and the microwave transmission system thereof.

Description of Related Arts

Recently, microwave as a clean, environment-friendly energy source is widely applied in various fields. The microwave is normally applied in metallurgy, food preparation, waste treatment and chemical industry, which is mainly for heating materials. Magnetrons are adopted as the microwave source to heat the materials for the high power output, outstanding high pressure capabilities delivered by the microwave reactors and large scale industrial applications. The materials undergo physical changes while chemical reactions may occur. Changes in dielectric properties are complicated and interactions between the materials and the microwave change accordingly. Especially, the changes in the reflection characteristics of the microwave cause mutation frequencies and lead to mode hopping, which compromise the working efficiency of the magnetron or even damage the magnetron. The situation limits the large scale industrial applications of the microwave.

A circulator connects the magnetron and a feeding structure to protect the magnetron from being damaged by the reflection frequencies. An isolation of the high power circulator is 20 dB while the reflection frequency of the magnetron is able to cause a mode hopping between −30 dB-40 dB which the magnetron is able to reach in practical use. The reflection frequencies prevent the magnetron from working normally or even worse burn the cathode of the magnetron by heating the magnetron with small power. The magnetron is thus wasted. Research shows the damage of the magnetron occurs with a sudden increase in the reflection frequencies.

In order to protect the microwave source and guarantee safety use, the conventional technology tries to control the transmitting frequency of the microwave source by monitor the reflection frequency but with less achievement due to complicate changes in the dielectric properties of the materials. The control system does not respond to the reflection frequency threshold synchronously when the monitoring threshold is set slightly high and the microwave source is damaged before the control system reacts. The heating efficiency and result is compromised if the monitoring threshold is set slightly low.

SUMMARY OF THE PRESENT INVENTION

An object of the present invention is to provide a method of controlling transmitting frequencies of microwave source and microwave transmission system thereof to solve the problems of the conventional technology.

The method of controlling transmitting frequencies of microwave source comprises the following steps of, a. collecting reflection frequencies of a load according to a pre-set sampling rate;
b. calculating a change rate of the reflection frequencies collected in the step a;
c. setting a reflection frequency threshold and a change rate threshold;
d. comparing the reflection frequencies and the change rate with the reflection frequency threshold and the change rate threshold respectively; wherein if the reflection frequencies or the change rate is less than the threshold goes to step e or returns to the step a;
e. sending control signals to the microwave source and tuning the transmitting frequencies; and
f. returning to step a.

Furthermore, in the step a, the sampling rate is set based on characteristics of the load.

Furthermore, the control signals comprise tuning information of the transmitting frequencies.

Furthermore, the microwave source is magnetron tubes.

Furthermore, the microwave source comprises not less than two magnetron tubes.

Furthermore, the microwave source is for heating.

A microwave transmission system for supporting the method comprises a microwave source, a sampling device and a controlling device; wherein the sampling device collecting a reflection frequencies according to a pre-set sampling rate; the controlling device is connected to the sampling device and the microwave source; control signals is outputted according to the reflection frequencies collected by the sampling device; the control signals controls transmitting frequencies of the microwave source; the controlling device further comprises a calculation module which calculates on the reflection frequencies collected by the sampling device to output a change rate of the reflection frequencies; the controlling device compares the reflection frequencies and the change rate with the reflection frequency threshold and the change rate threshold saved in the controlling device respectively to output the control signals for tuning the transmitting frequencies.

Furthermore, the microwave source is magnetron tubes.

Furthermore, the microwave source comprises not less than two magnetron tubes.

Furthermore, the controlling device output the control signals for tuning the transmitting frequencies; the control signals are decided by the reflection frequencies and the change rate of the reflection frequencies.

The microwave control method and control system is able to be widely applied in microwave field especially high power microwave field where a protection of the microwave source is required. The present invention is able to be applied in microwave measure system, microwave heating system, etc. The present invention is for tuning a single magnetron tube or multiple magnetron tubes.

The below figures and embodiments are for better illustrating the present invention and not a limitation of the present invention. The advantages of the present invention are listed below.

DETAILED DESCRIPTION OF THE PREFERRED EMBODIMENT

The features of the embodiment are able to be combined if not conflicted.

The figures and the below embodiment are for better illustrate the present invention. The embodiment described below is just one aspect of the present invention and not all the possibilities. The modifications and alterations without innovation of the skilled in the field are within the protection scope of the present invention.

The load in the present invention refers to the materials under processing by the microwave, such as the materials heated by the microwave, materials reacting under the microwave or the materials are measured under the microwave. The load also refers to containers for keeping the materials or a heated cavity.

Figure 1:
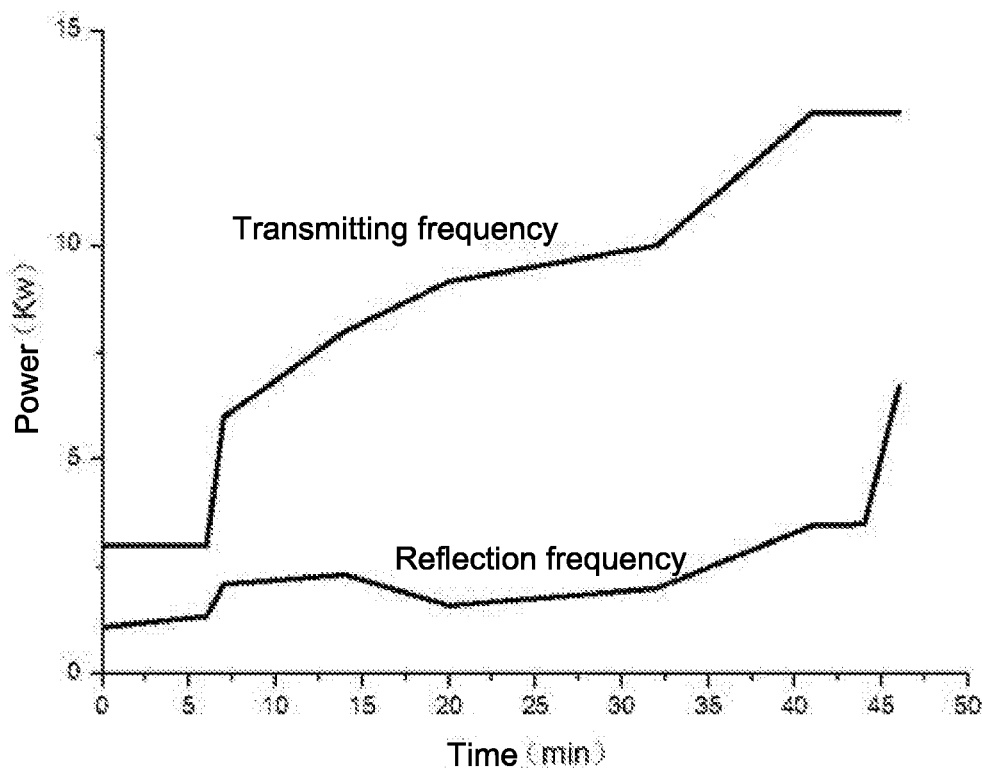
FIG. 1 is curves of transmission frequencies and reflection frequencies of a measured microwave processing system.

The physical features of the materials under the processing of the microwave system are changing, which mainly is a decrease in water containing due to heating by the microwave. The FIG. 1 shows the curve of the transmission frequencies and reflection frequencies of the measured microwave processing system.

The microwave system in the embodiment is a high power microwave heating system with a working frequency of 915 MHz which is applied in heating the waste water in a nuclear power plant. The waste water is steamed for collecting radioactive waste. The transmitting frequency is tuned to 13.1 kW and output constantly after heating the waste water for 40 minutes. The reflection frequencies rise suddenly at 45 minutes. The reflection frequencies increase from less than 3 kW to 7 kW in less than two minutes and the change rate of the reflection frequencies is bigger than 2 kw/min. On the other hand, the transmitting frequency increases from 3 kW to 13.1 kW within 43 minutes with a change in reflection frequency under 3 kW and the average change rate of the reflection frequencies is less than 0.07 kw/min. The difference is caused by the diminishing in water and increasing in concentration of the solution which lead to a change in macro-parameter of the material and a sudden change in the reflection frequencies. The microwave system is keeping heating and steaming the material and the reflection frequencies are within the limit of the microwave source, but a rapid tuning of the transmitting frequency is required. The transmitting frequency is cut and even a shut off of the microwave source is required to prevent the reflection frequencies from increasing continuously and burning the microwave source.

Researches show the reflection frequencies suddenly increases when the microwave processes different materials which are heated for a certain period of time respectively. The reflection frequencies may within the limit of the microwave system, but without instant tuning the sudden increase in the reflection frequencies will damage the system or burn the microwave source especially the magnetron tubes.

The macro-parameters of the materials and the reflection features of the microwave are changing during heating by a microwave, which are complicated and difficult to measure precisely. The change rate of the reflection frequencies is able to be conveniently measured. The rapid change in the reflection frequencies induces mode hopping of the magnetron tubes and damages the 7E mode of the magnetron, which disables the transmitting frequencies and damages the magnetron tubes. The reflection frequencies are not necessarily huge but still are able to damage the magnetron tubes.

The present invention provides a solution for tuning the transmitting frequency of the microwave source by checking the reflection frequencies and the change rate of the reflection frequencies to protect the microwave source instantly and efficiently.

The below embodiment illustrates the present invention in details with a microwave system comprises magnetron tubes.

Embodiment

Figure 2:
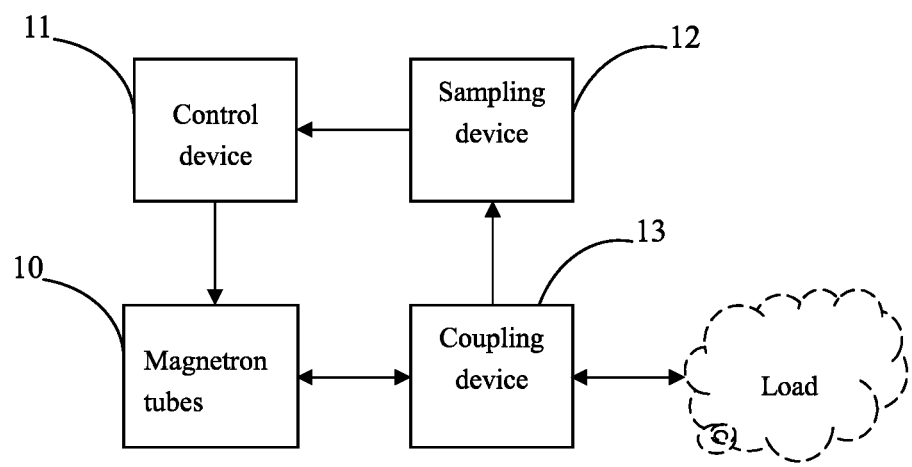
FIG. 2 shows a structure of the microwave processing system in the FIG. 1.

As show in the FIG. 2, the present microwave transmission system comprises microwave source 10, sampling device 12 and a controlling device 11.

The microwave source 10 comprises four magnetron tubes which generates transmitting frequencies and heats the load through a coupler 13.

The sampling device 12 collects the reflection frequencies according to the pre-set samplings through the coupler 13.

The sampling device 12 is able to adopt a power meter or a measuring circuit to measure the reflection frequencies by one or more ways.

The controlling device 11 is connected to the sampling device 12 and the microwave source 10 to form a feedback loop.

The controlling device 11 outputs control signals and controls the transmitting frequencies according to the reflection frequencies collected by the sampling device 12.

The controlling device 11 further comprises calculation modules to calculate the change rate of the reflection frequencies according to the data collected by the sampling device 12.

The reflection frequency threshold and the change rate threshold are saved in the controlling device 11 which compares the collected reflection frequencies and the change rate with the corresponding threshold and output control signals for tuning the transmitting frequencies.

The hardware of the control device 11 comprises a PLC (Programmable Logic Controller), microcontrollers, embedded system, FPGA (Field—programmable Gate Array) and etc. which is able to output control signals according to the reflection frequencies and the change rate of the reflection frequencies for tuning the transmitting frequencies of the microwave source.

Figure 3:
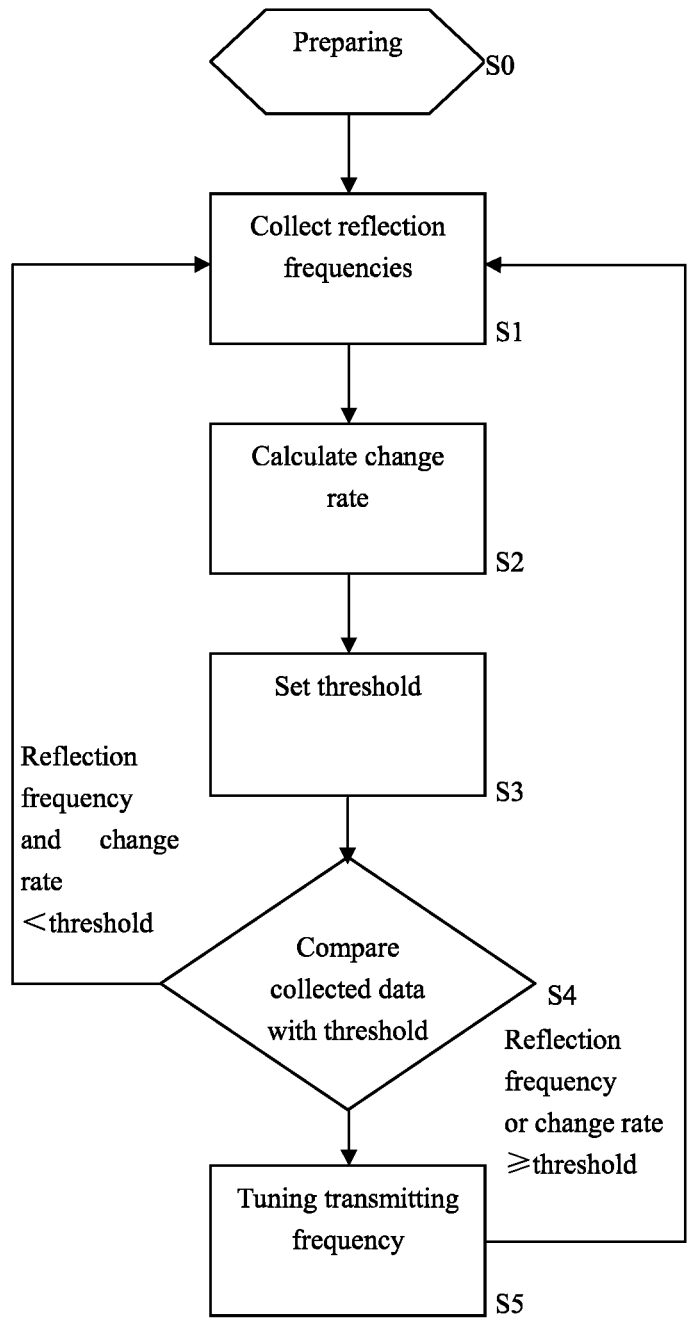
FIG. 3 is a flow chart of controlling a microwave source transmitting frequency.

FIG. 3 is the flow chart of the transmitting frequency control, comprising the following steps of:

S1. collecting reflection frequencies of a load according to a pre-set sampling rate; wherein a power meter or a measuring circuit is able to be adopted for collecting the reflection frequencies. The pre-set sampling is able to be pre-set according to different loads. A higher sampling value is set for the load which is sensitive to the change of the transmitting wave. Otherwise a lower sampling value is set.

S2. calculating a change rate of the reflection frequencies collected in the step S1; wherein the change rate is able to be calculated with the formula $(A_{r1}-A_{r2})/t1-t2$; $A_{r1}$ is the reflection frequencies collected at t1; $A_{r2}$ the reflection frequencies collected at t2; t1–t2 indicates the interval between the two samplings, which is related to sampling rate; shorter interval is set for materials the dielectric characteristics of which are sensitive to the microwave for the change in reflection frequencies is rapid; the change in reflection frequencies is indicated timely.

S3. setting a reflection frequency threshold and a change rate threshold;

S4. comparing the reflection frequencies and the change rate with the reflection frequency threshold and the change rate threshold respectively; wherein if the reflection frequencies or the change rate is less than the threshold goes to step S5, otherwise returns to the step S1; and S5. sending control signals to the microwave source and tuning the transmitting frequencies; returning to S1 or end the process by shutting off the microwave source;

wherein the control signal comprises tuning information of the transmitting frequencies, which enables tuning of the transmitting frequencies of the microwave source according to the collected reflection frequencies and change rate of the reflection frequencies; the transmitting frequencies are reduced significantly when the change rate is high, otherwise the transmitting frequencies are tuned slightly.

The present invention is especially smart for microwave sources adopting magnetron tubes, such as microwave heating device, microwave reactor, microwave measuring system and etc. The present invention shows great advantages in high power microwave system with more than two magnetron tubes.

What is claimed is:

1. A method of controlling the transmitting frequencies of a microwave source, comprising steps of:

a: collecting reflection frequencies of a load according to a pre-set sampling rate;

b: calculating a change rate of the reflection frequencies collected in the step a;

c: setting a reflection frequency threshold and a change rate threshold;

d: comparing the reflection frequencies and the change rate with the reflection frequency threshold and the change rate threshold respectively; if the reflection frequencies or the change rate is less than the threshold, going to step e; if not, returning to the step a;

e: sending control signals to the microwave source and tuning the transmitting frequencies; and f: returning to the step a;

wherein the microwave source is magnetron tubes wherein the microwave source comprises not less than two magnetron tubes.

2. The method of controlling the transmitting frequencies of the microwave source, as recited in claim 1, wherein the microwave source is for heating.

3. A microwave transmission system, comprises a microwave source, a sampling device and a controlling device; wherein the sampling device collecting a reflection frequencies according to a pre-set sampling rate; the controlling device is connected to the sampling device and the microwave source; control signals is outputted according to the reflection frequencies collected by the sampling device; the control signals control transmitting frequencies of the microwave source; the controlling device further comprises a calculation module which calculates on the reflection frequencies collected by the sampling device to output a change rate of the reflection frequencies; the controlling device compares the reflection frequencies and the change rate with a reflection frequency threshold and a change rate threshold saved in the controlling device respectively to output the control signals for tuning the transmitting frequencies;

wherein the microwave source is magnetron tubes;

wherein the microwave source comprises not less than two magnetron tubes.

* * * * *